(12) United States Patent  (10) Patent No.: US 7,093,168 B2
Mahoney  (45) Date of Patent: Aug. 15, 2006

(54) SIGNAL VALIDATION AND ARBITRATION SYSTEM AND METHOD

(75) Inventor: Timothy D. Mahoney, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 724 days.

(21) Appl. No.: 10/237,834

(22) Filed: Sep. 9, 2002

(65) Prior Publication Data

US 2003/0140268 A1    Jul. 24, 2003

Related U.S. Application Data

(60) Provisional application No. 60/350,452, filed on Jan. 22, 2002.

(51) Int. Cl.
    *G06F 11/00*    (2006.01)
(52) U.S. Cl. .......................................... 714/47; 700/21
(58) Field of Classification Search .................. 714/21
    See application file for complete search history.

(56) References Cited

U.S. PATENT DOCUMENTS

| | | | |
|---|---|---|---|
| 4,774,709 A | | 9/1988 | Tulplue et al. |
| 5,001,638 A | * | 3/1991 | Zimmerman et al. ......... 701/14 |
| 5,036,479 A | | 7/1991 | Prednis et al. |
| 5,184,312 A | | 2/1993 | Ellis |
| 5,223,788 A | | 6/1993 | Andreano et al. |
| 5,293,323 A | | 3/1994 | Doskocil et al. |
| 5,394,409 A | | 2/1995 | Barthel et al. |
| 5,469,447 A | * | 11/1995 | Brunemann et al. ......... 714/797 |
| 5,548,597 A | * | 8/1996 | Kayama et al. ............. 714/736 |
| 5,638,383 A | | 6/1997 | Wotzak et al. |
| 5,642,057 A | | 6/1997 | Oke et al. |
| 5,661,735 A | * | 8/1997 | Fischer ....................... 714/800 |
| 5,675,729 A | | 10/1997 | Mehring |
| 5,680,409 A | * | 10/1997 | Qin et al. ..................... 714/799 |
| 5,937,366 A | | 8/1999 | Zbytniewski et al. |
| 6,000,040 A | | 12/1999 | Culley et al. |
| 6,061,809 A | | 5/2000 | Glaser et al. |
| 6,195,763 B1 | | 2/2001 | Mayer et al. |
| 6,272,653 B1 | | 8/2001 | Amstutz |
| 6,295,490 B1 | | 9/2001 | Streib |
| 6,594,620 B1 | * | 7/2003 | Qin et al. ..................... 702/185 |
| 6,636,991 B1 | * | 10/2003 | Quach ......................... 714/52 |
| 6,831,466 B1 | * | 12/2004 | Down et al. ................. 324/555 |
| 6,842,669 B1 | * | 1/2005 | Bednar et al. ............... 700/292 |
| 2002/0178404 A1 | * | 11/2002 | Austen et al. ................ 714/43 |

FOREIGN PATENT DOCUMENTS

GB    2 255 838    11/1992
WO    PCT/US03/01994    5/2003

OTHER PUBLICATIONS

Microsoft Press Computer Dictionary Third Edition, "truth table", Microsoft Press, 1997, p. 478.*

* cited by examiner

*Primary Examiner*—Scott Baderman
*Assistant Examiner*—Gabriel L. Chu
(74) *Attorney, Agent, or Firm*—Ingrassia Fisher & Lorenz

(57) ABSTRACT

A common design framework for input and output signal validation, arbitration, and fault reporting for real-time controllers includes a method of validating redundant input and output signals and arbitrating between the redundant input and output signals by determining a fault severity level for each of the redundant input and output signals, and determining a signal to transmit for further processing based at least in part on the determined fault severity levels.

55 Claims, 14 Drawing Sheets

SIGNAL VALIDATION AND ARBITRATION SYSTEM AND METHOD

CROSS REFERENCE TO RELATED APPLICATION

This application claims the benefit of U.S. Provisional Application Ser. No. 60/350,452, filed Jan. 22, 2002.

FIELD OF THE INVENTION

The present invention relates to electronic controllers and, more particularly, to a method of validating and arbitrating input and output signals to and from such controllers, which can be used in various applications including various aircraft-related applications.

BACKGROUND OF THE INVENTION

Various instrumentation and control systems are designed with component redundancy so that the system may continue functioning in the unlikely event a component fails or is inoperative. For example, a system may include redundant sensors, which sense the same parameter and supply redundant sensor signals, and redundant electrical or electronic drivers, which drive redundant system components. The system may also include a controller, such as a real-time embedded electronic controller, that, among other things, receives, conditions, validates, and arbitrates the redundant sensor signals. The conditioned, validated, and arbitrated signals may then be passed along to control logic, which may be part of the controller itself, to compute appropriate control outputs that may be supplied to the redundant drivers. The controller may also validate and arbitrate redundant output signals, and supply a validated and arbitrated output signal to enable an appropriate one of the redundant drivers to implement the computed control output. The controller may also be used to implement fault reporting.

The design requirements and functional implementation for the above-described redundant signal validation, arbitration, and fault reporting can be quite complex. Moreover, the complexity may depend on a number of different parameters including, but not limited to, the number of redundant inputs, whether synthesized inputs are used, use of back-up signals, the number of built-in-test (BIT) signals that are used, and the number and variety of system states that may affect input signal and BIT signal validity. Some of these parameters may be system specific. Thus, the design and implementation of the validation, arbitration, and fault reporting may vary from application to application, and from system designer to system designer. This complexity may also result in significant software development efforts, which can increase system design and implementation costs.

Hence, there is a need for a common design framework for input and output signal validation, arbitration, and fault reporting for controllers, such as real-time embedded electronic controllers, that reduces system development complexity, and/or reduces system development cycle time and/or reduces development costs. The present invention addresses one or more of these needs.

SUMMARY OF THE INVENTION

The present invention provides a common design framework for input and output signal validation, arbitration, and fault reporting for real-time controllers.

In one embodiment of the present invention, and by way of example only, a method is provided that validates redundant input signals and arbitrates between the redundant input signals in a system including a controller having at least two redundant input signals. A fault severity level for each of the redundant input signals is determined. A signal value to transmit for further processing by the controller is determined based at least in part on the determined fault severity level of each of the redundant input signals.

In another exemplary embodiment, a method is provided that validates redundant output drivers and arbitrates between the redundant output drivers in a system including a controller having at least two redundant output drivers coupled to receive a control signal. A fault severity level for each of the redundant output drivers is determined. One of the redundant output drivers is selected to receive the control signal by the controller based at least in part on the determined fault severity level of each of the redundant output drivers.

Other independent features and advantages of the preferred signal validation and arbitration system and method will become apparent from the following detailed description, taken in conjunction with the accompanying drawings which illustrate, by way of example, the principles of the invention.

DETAILED DESCRIPTION OF A PREFERRED EMBODIMENT

Figure 1:
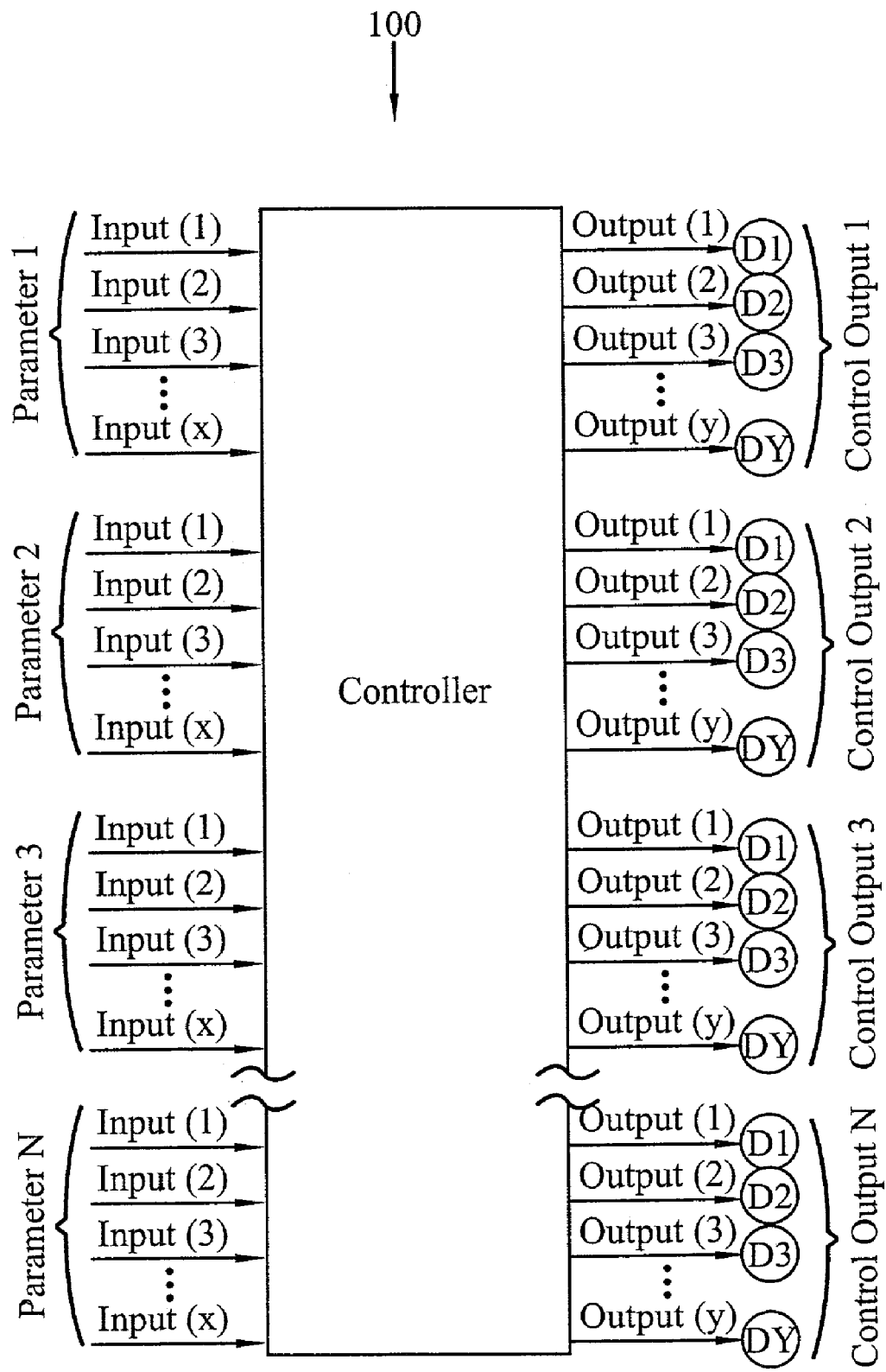
FIG. 1 is a functional block diagram of an exemplary multi-channel controller having multiple, redundant input signals and multiple, redundant output signals that may implement the system and method of the present invention.

A functional block diagram of an exemplary multi-channel controller that may be used to implement the present invention is depicted in FIG. 1. The controller 100 is configured such that each channel may receive multiple redundant input signals and may supply multiple redundant output signals. In the depicted embodiment, the controller includes "N" channels, with each channel receiving "X" redundant input signals and supplying "Y" redundant output signals. The "X" redundant input signals may each include, for example, an input signal representative of a monitored parameter, and a built-in-test (BIT) signal. The monitored parameter may be a physical parameter such as, for example, temperature, pressure, viscosity, and revolutions per minute. It will be appreciated, however, that the parameter is not limited to physical parameters. The "Y" redundant output signals may each include, for example, an appropriate control signal and a driver enable/disable signal, which are each supplied to "Y" redundant drivers D1, D2, D3, . . . DY. The control signals are used to control a non-illustrated component such as, for example, a pump or valve, to thereby control the parameter being monitored to a desired magnitude. The driver enable/disable signals are used to enable a particular component driver D1, D2, D3, . . . DY in the channel receiving the control signal, and to disable the other component drivers D1, D2, D3, . . . DY in the same channel.

Figure 2:
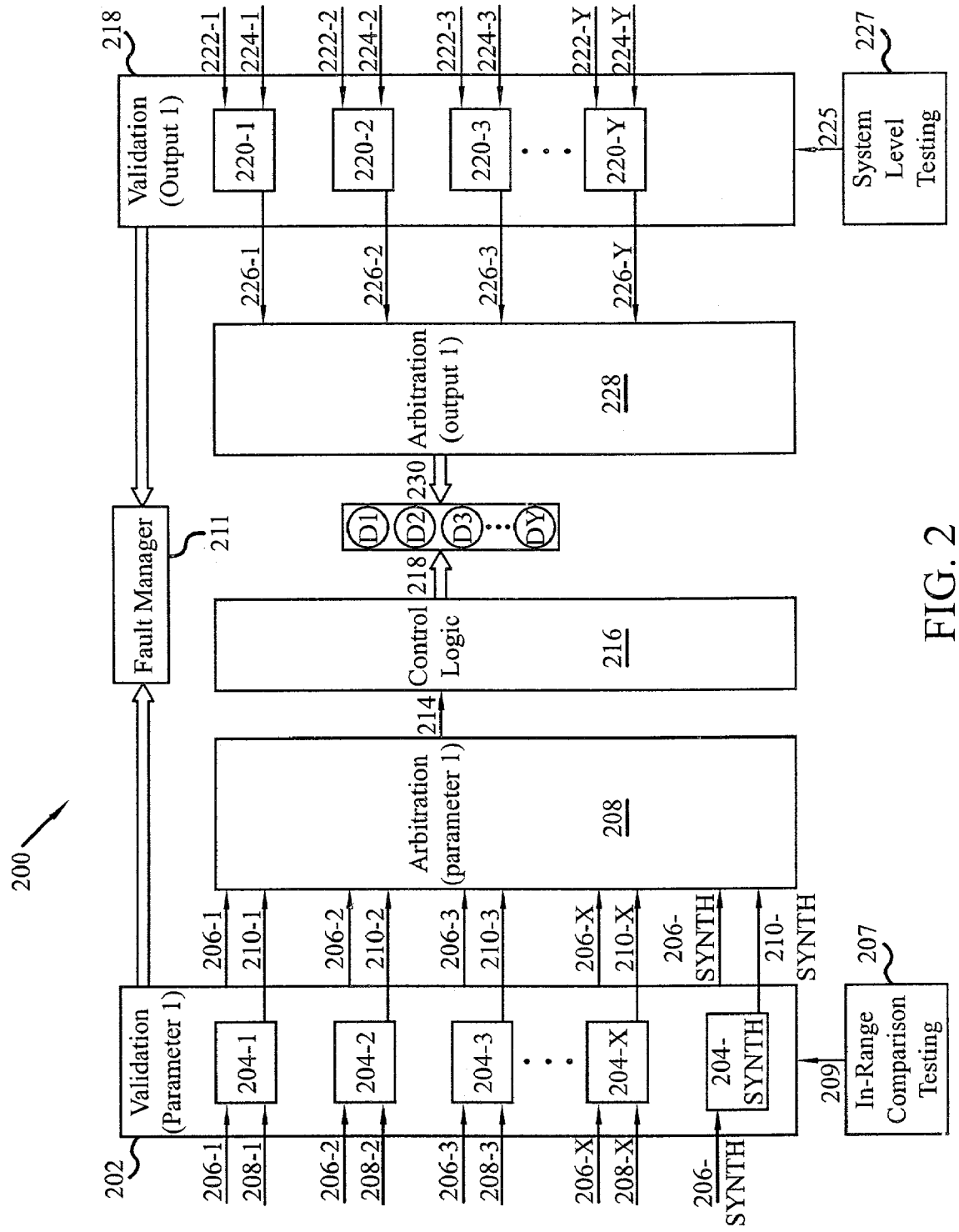
FIG. 2 is a simplified functional block diagram of an exemplary channel according to an embodiment of the present invention that forms part of the controller depicted in FIG. 1.

Turning to FIG. 2, which is a simplified functional block diagram of a single exemplary channel 200 within the controller 100, a general description of the processing that occurs within the controller 100 will now be provided. As was noted above, each channel 200 within the controller 100 receives redundant input signals representative of a single parameter. In some instances, one or more of these redundant input signals may not be valid. This may occur, for example, in the unlikely event that a component fails or is otherwise inoperative, or this may be the result of the presently existing system configuration. Thus, each channel 200 within the controller 100 includes an input signal validation process block 202 that functions to validate each of the redundant input signals. To do so, the input signal validation process block 202, in the depicted embodiment, includes an individual input signal validation process block 204-1, 204-2, 204-3, . . . 204-X for each of the redundant input signals. Each input signal validation process block 204-1, 204-2, 204-3, . . . 204-X receives a plurality of signals. Included among these signals are one of the redundant input signals that is representative of the monitored parameter 206-1, 206-2, 206-3, . . . 206-X, and built-in-test (BIT) signals 208-1, 208-2, 208-3, . . . 208-X associated with each of the redundant input signals. The input signal validation process block 202 may also include one or more synthesized signal validation process blocks 204-SYNTH for one or more synthesized input signals 206-SYNTH that may be supplied to the channel 200. The synthesized input signals are generated within the system, and are calculated from various other known or measured system parameters. In addition, the input signal validation process block 202 may also receive test result signals 209 from signal testing processes, such as an in-range comparison testing process 207. As will be described in more detail below, each of the individual input signal validation process blocks 204-1, 204-2, 204-3, . . . 204-X, 204-SYNTH processes at least its respective input signal 206-1, 206-2, 206-3, . . . 206-X, 206-SYNTH, the test result signals 209, and its respective BIT signal 208-1, 208-2, 208-3, . . . 208-X, and supplies a "severity level" signal 210-1, 210-2, 210-3, . . . 210-X, 210-SYNTH. The severity level signal, which is described more fully below, is related to the validity of its respective input signal. In addition, each input signal validation process block 204-1, 204-2, 204-3, . . . 204-X, 204-SYNTH also supplies appropriate fault signals to a system fault manager 211.

Only one signal value 214 is used by each controller channel 200 to generate an appropriate control signal. Thus, each controller channel 200 also includes an input signal arbitration process block 208. The input signal arbitration process block 212 receives each of the redundant and synthesized input signals 206-1, 206-2, 206-3, . . . 206-X, 206-SYNTH, as well as the input signal severity level signal 210-1, 210-2, 210-3, . . . 210-X, 210-SYNTH from the individual input signal validation process blocks 204-1, 204-2, 204-3, . . . 204-X, 204-SYNTH. As will be described more fully below, the input signal arbitration process block 208 uses the redundant and synthesized input signals 206-1, 206-2, 206-3, . . . 206-X, 206-SYNTH and the associated input signal severity level signal 210-1, 210-2, 210-3, . . . 210-X, 210-SYNTH to arbitrate between the redundant and synthesized input signals 206-1, 206-2, 206-3, . . . 206-X, 206-SYNTH, and to supply the appropriate signal value 214 to a control logic process block 216 within the channel 200.

The control logic process block 216 within the channel 200 receives, among other things, the signal value 214 supplied by the arbitration process block 208. The control logic process block 216 uses this signal value 214 to generate an appropriate control signal 218, which is then supplied to the redundant component drivers D1, D2, D3, . . . DY coupled to the channel 200. When one of these component drivers is enabled, it will supply the generated control signal to a non-illustrated component to control the parameter being monitored by the channel 200.

In addition to receiving redundant input signals, each channel 200 within the controller 100 also supplies a plurality of redundant output signals. As was noted above, these redundant output signals are supplied to the redundant component drivers D1, D2, D3, . . . DY, only one of which is enabled and used to drive a control component. As with the input signals, one or more of the component drivers D1, D2, D3, . . . DY may not be fully operative. Thus, similar to the input signals, each channel 200 within the controller 100 validates each component driver and arbitrates between each driver, so that only a single component driver within each channel 200 is enabled. To do so, each channel includes an output signal validation process block 218 and an output signal arbitration process block 228.

The output signal validation process block 218, similar to the input signal validation process block 202, includes an individual output signal validation process block 220-1, 220-2, 220-3, . . . 220-Y for each of the redundant output signals. Each of the output signal validation process blocks 220-1, 220-2, 220-3, . . . 220-Y receives a plurality of signals. Included among these signals are BIT signals 222-1, 222-2, 222-3, . . . 222-Y associated with each of the redundant drivers D1, D2, D3, . . . DY coupled to the channel 200. The signals may also include various driver command signals 224-1, 224-2, 224-3, . . . 224-Y that may be independently generated by the controller 100, and a system level test result signal 225 supplied from a system level test block 227. As will be described in more detail below, each of the individual output signal validation process blocks 220-1, 220-2, 220-3, . . . 220-Y processes its respective plurality of input signals and supplies a severity level signal 226-1, 226-2, 226-3, . . . 226-Y, which is related to the validity of its respective output driver.

The output signal arbitration process block 228 receives the output signal severity level signal 226-1, 226-2, 226-3, . . . 226-Y from the output signal validation process block 218. As will be described more fully below, the output signal arbitration process block 228 uses the severity levels 226-1, 226-2, 226-3, . . . 226-Y to arbitrate between the redundant output drivers in the channel 200, and to supply driver enable/disable signals 230, as appropriate, to the redundant drivers D1, D2, D3, . . . DY, so that a single driver in each channel 200 is enabled.

Having described the input and output signal validation and arbitration process blocks and their respective processes in general, a detailed description of an exemplary embodiment of each will now be provided. In doing so, to simplify the explanation and associated drawings, each of the process blocks will be described and illustrated assuming that the system channel includes only two redundant inputs and two redundant outputs.

Figure 3:
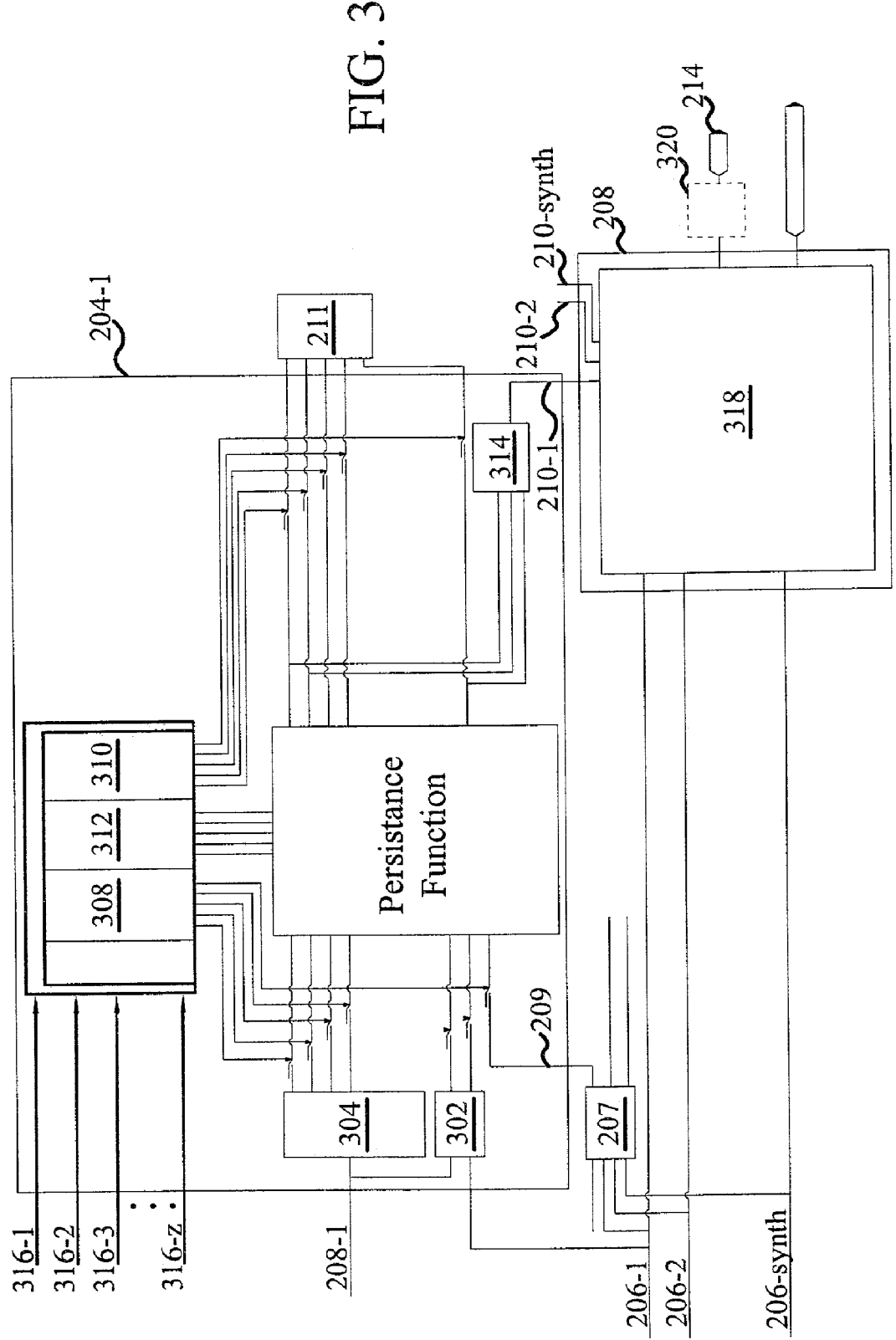
FIGS. 3–3E are more detailed functional block diagrams of those portions of the exemplary channel depicted in FIG. 2 that implement the input signal validation and arbitration methodology according to an exemplary embodiment of the present invention.
Figure 3A:
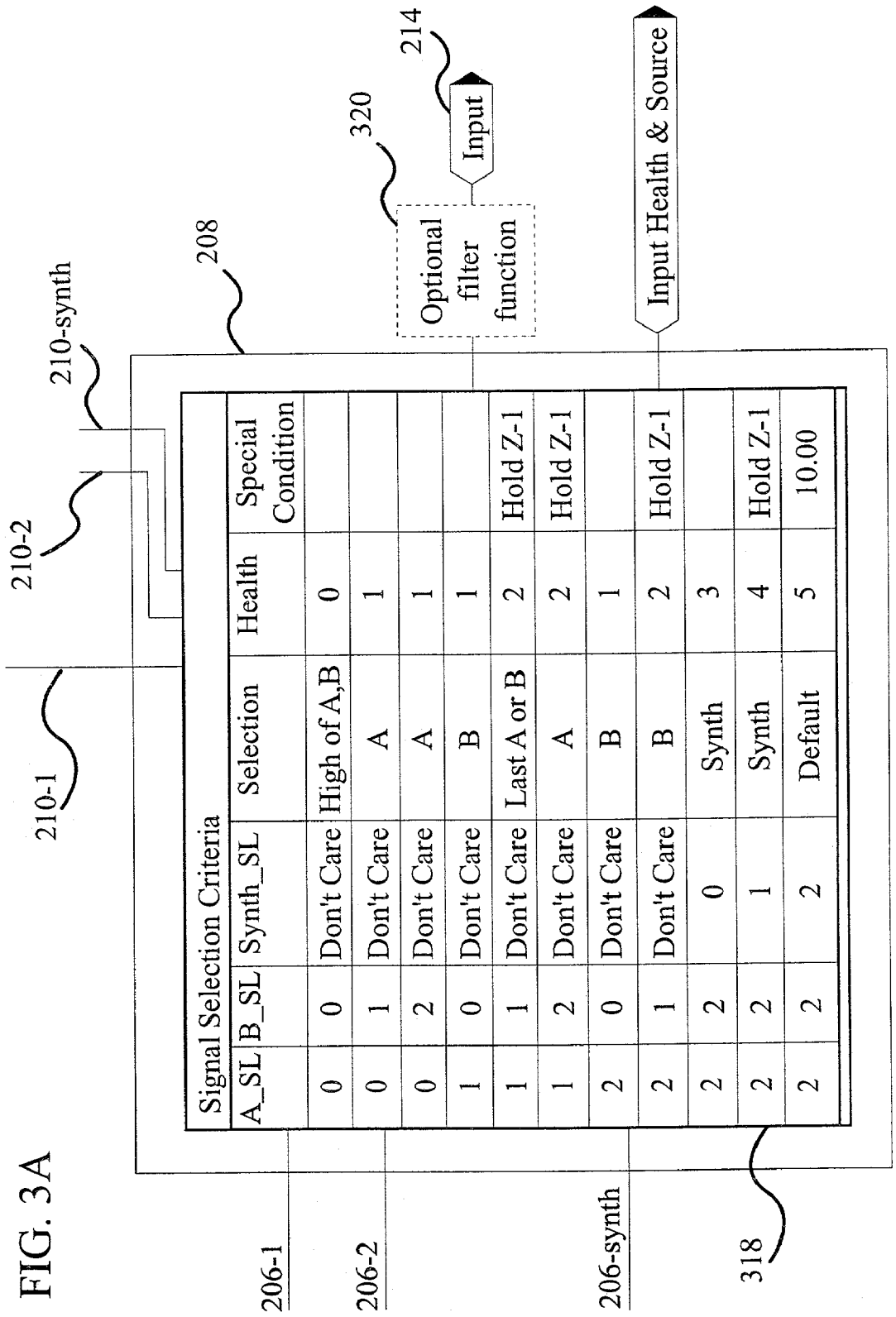
Figure 3B:
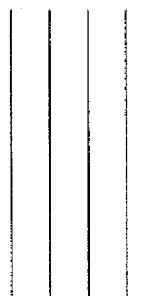
Figure 3C:
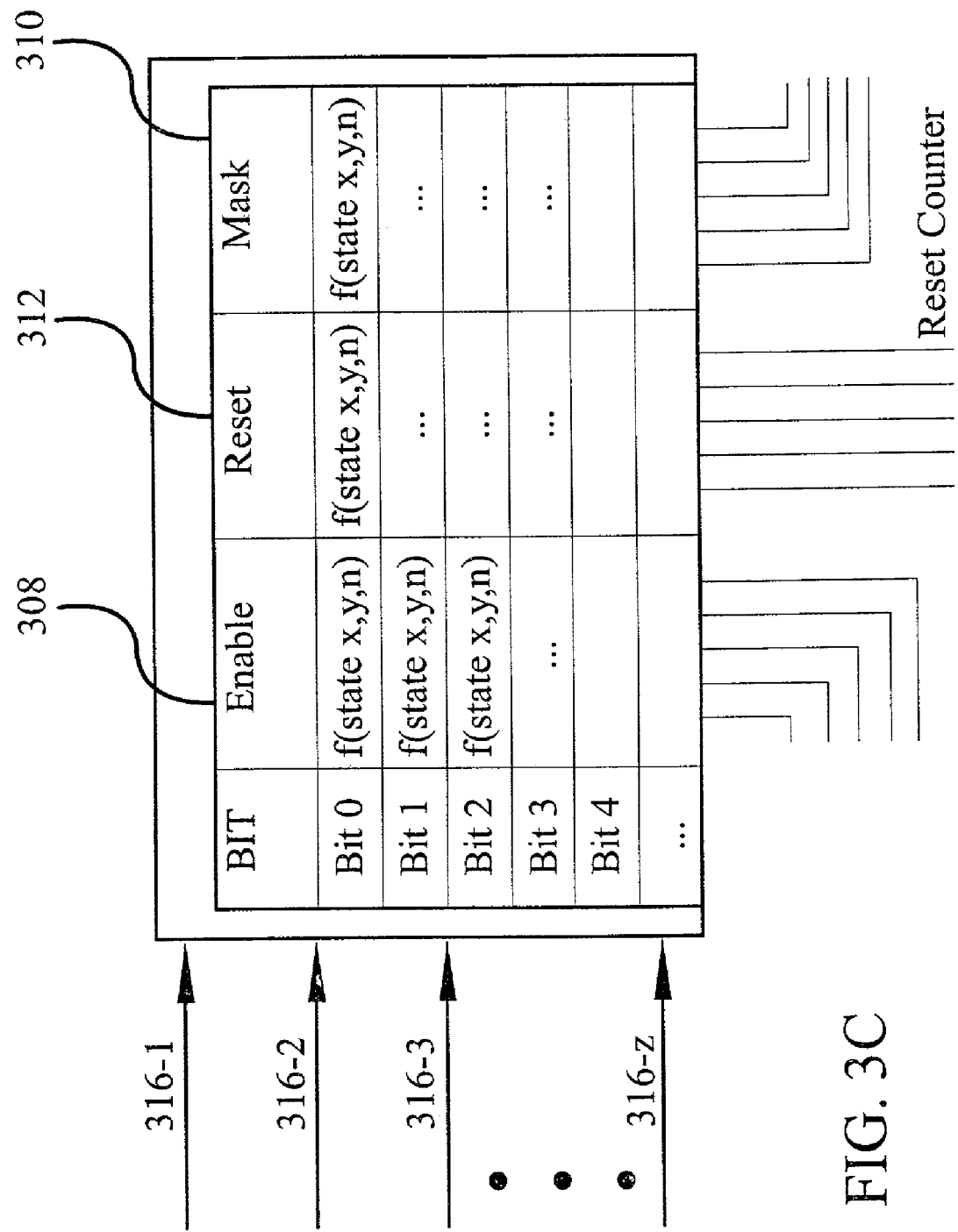
Figure 3D:
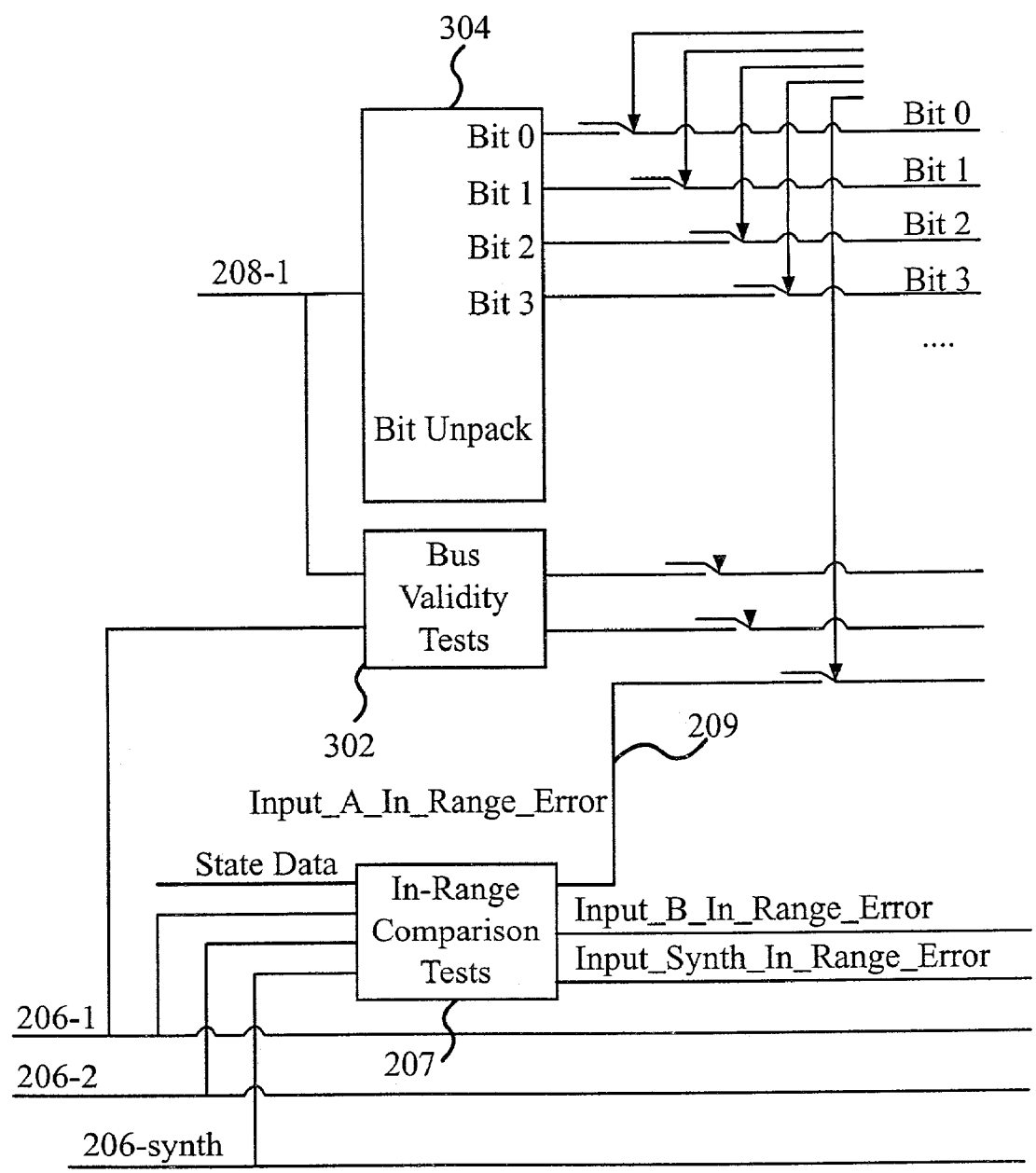
Figure 3E:
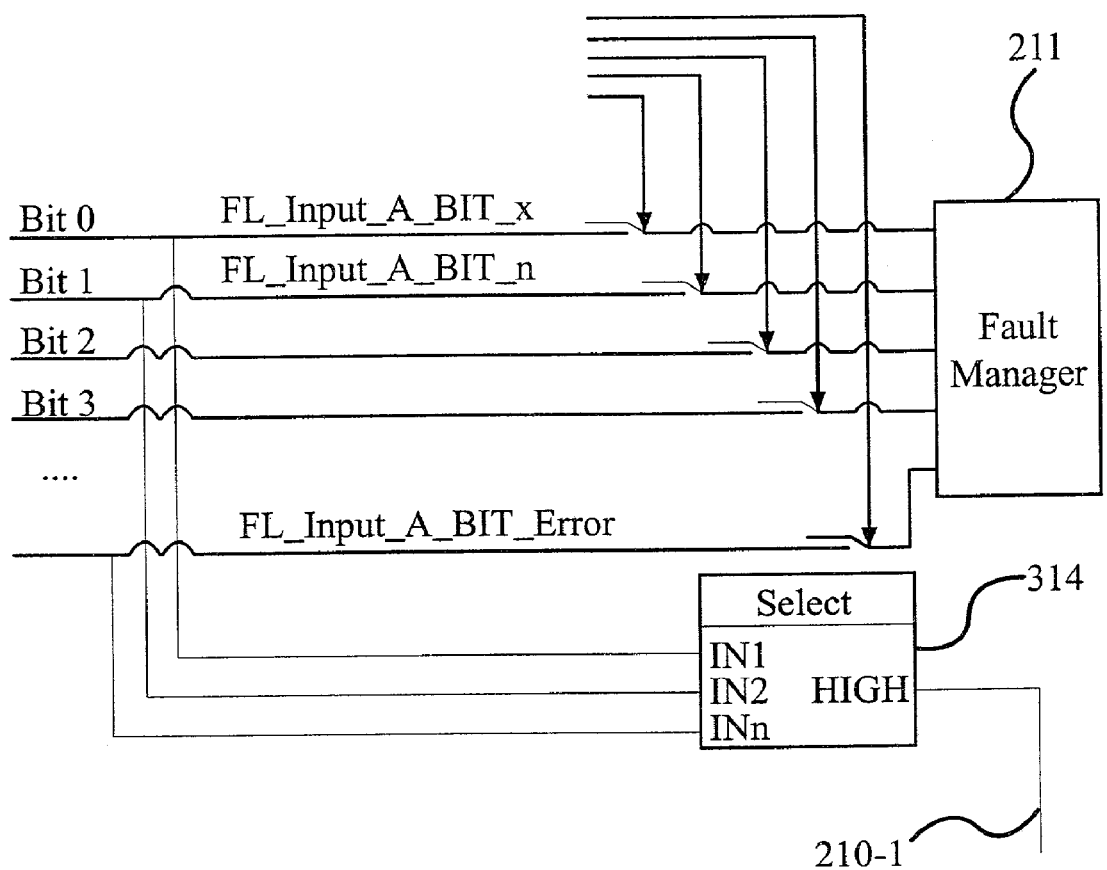

With reference now to FIGS. 3–3E, the input signal validation and arbitration process blocks and the processes carried out by each will first be discussed in detail. Beginning with the individual input signal validation process blocks 204-1, 204-2, 204-3, . . . 204-X, 204-SYNTH an exemplary one of which is illustrated in FIGS. 3–3E, it can be seen that each one of these blocks, at least in the depicted embodiment, includes a bus validity test block 302, a BIT signal processing block 304, a persistence function processing block 306, a BIT flag enable block 308, a BIT flag mask block 310, a counter reset block 312, and a severity level select block 314. It can also be seen that the depicted individual input signal arbitration process block 204-1 receives a plurality of input signals, which includes one of the redundant input signals 206-1, the BIT signal 208-1 associated with the redundant input, the in-range comparison test result signal 209, as well as a plurality of state data signals 316-1, 316-2, 316-3, . . . 316-Z.

The input signal 206-1 is supplied to the bus validity test block 302. The bus validity test block 302 functions to determine various instances of signal failures that may not be generated from the BIT test suite associated with the input signal, and to supply one or more bus validity fault flags. For example, for cases where either the input signal 204-1 or the BIT signal 208-1 is not available due, for example, to a bus failure, the bus validity test block 302 will generate an appropriate bus validity fault flag. The specific types of signal failures and criteria for each may vary and may be determined by the particular system designer.

The BIT signal 208-1 may be a digital word that is made up of individual BIT fault flags, each of which is associated with a particular test. Thus, the BIT signal 208-1, in the depicted embodiment, is supplied to the BIT signal processing block 304. The BIT signal processing block 304 unpacks and retrieves the individual BIT fault flags from the BIT word. An individual BIT fault flag may be set to a "true" state (e.g., a logical "1") if, for example, the particular test limit has been exceeded. Otherwise, it will be set to a "false" state (e.g., a logical "0"). As with the bus validity test, the specific types of failures detected by the BIT test suite, and criteria for each, may vary and may be determined by the particular system designer.

The in-range comparison test block 207 receives each of the redundant and synthesized input signals 206-1, 206-2, 206-SYNTH in the particular controller channel 200, and compares the signals to one another. The in-range comparison test block 207 then determines if the input signal 206-1 associated with the individual input signal validation process blocks 204-1 deviates from the other redundant and synthesized input signal 206-2, 206-SYNTH in the same channel 200 by a predetermined amount. Based on this comparison, the in-range comparison test block 207 will generate an in-range test fault flag, signifying whether or not an in-range fault exists. The in-range test fault flag is the supplied in-range comparison test result signal 209. It will be appreciated that the in-range test criteria may be determined by the particular designer for a given set of inputs.

The bus validity fault flags from the bus validity test block 302, the BIT fault flags from the BIT signal processing block 304, and the in-range test fault flag from the in-range test block 207, are supplied to the persistence function process block 306. The persistence function process block 306 confirms the state of each of these particular fault flags based upon a specified time period that each fault flag persists in a true state. In the depicted embodiment, the persistence function process block 306 implements an up/down counter to determine the time period that a fault flag persists in a true state. The up/down counter for a particular fault flag will increment or decrement depending upon whether the fault flag is set to a true state or a false state. For example, in the depicted embodiment, the up/down counter will increment when the fault flag is set to a true state, and will decrement when it is set false. It will be appreciated that the opposite implementation could also be used.

The up/down counter operates a rate defined by the system designer so as to correspond to a predetermined time period. When the count limit for a particular fault flag is reached, which corresponds to a predetermined time limit, the persistence function process block 306 will supply a signal (e.g., a "2") indicating that the fault associated with the particular fault flag is "confirmed." Prior to reaching the count limit, the persistence function process block 306 will supply a signal (e.g., a "1") indicating that the fault associated with the particular fault flag is "unconfirmed." Otherwise, the persistence function process block 306 will supply a signal (e.g., a "0") indicating that this particular fault does not exist.

The persistence function process block 306 also implements a transition counter. The transition counter is used to count the number of times that a "confirmed" fault recovers. That is, it counts the number of times that a "confirmed" fault transitions to a state where it no longer exists. There is a transition limit associated with each fault flag that sets the maximum number of times that a "confirmed" fault may transition to a recovered state. When the maximum number of transitions is reached by a particular fault flag, the up/down counter for that flag is inhibited from further decrementing. The maximum number of allowed transitions for each fault flag may be set by the particular system designer.

There may be certain system state conditions where one or more fault flags are set, indicating some type of fault with the input signal 206-1, when there is actually no problem at all. In addition, there may be certain system state conditions where it is desirable to reset one or more of the up/down counters in the persistence function process block 306 to restore full signal functionality. There may also be certain system state conditions where a fault flag may be confirmed and accommodated within the controller 100, but need not, or should not, be logged to the fault manager 211. For such state conditions, the input signal validation and arbitration processing should continue, but the fault may not need to be logged in the fault manager. For example, a particular switch in the system may be positioned such that it inhibits the input signal 206-1 from reaching the controller 100, and this switch state is known to the controller 100. Additionally, the system may be in a certain state where some input data may be expected over a data bus that is not yet available. Further, there may be certain system state conditions where a fault flag may be set as a result of some other fault (i.e., a cascading fault). For example, an analog-to-digital (A/D) conditoning circuit may have failed, causing the input signal to fail the in-range test. In this instance, the BIT test suite may have already caused a fault flag to be set, so it may be desirable to inhibit the in-range fault flag from being logged in the fault manager 211, thereby eliminating any potential troubleshooting ambiguity.

To accommodate the above-noted state conditions, the BIT flag enable block 308, the BIT flag mask block 310, and the counter reset block 312, receive the plurality of state data signals 316-1, 316-2, 316-3, . . . 316-Z. The state data signals 316-1, 316-2, 316-3, . . . 316-Z supply information regarding the state of the system into which the controller 100 is installed by, for example, including information regarding certain subsystems, system components, and/or system environmental conditions. The BIT flag enable block 308 selectively inhibits each of the fault flags in the individual signal validation process block 204-1 from incrementing its particular up/down counter implemented in the persistence function process block 306, based on the information contained in the state data signals 316-1, 316-2, 316-3, . . . 316-Z. The counter reset block 312 selectively resets specific ones of the fault flag up/down counters implemented in the persistence function process block 306 based on the information contained in the state data signals 316-1, 316-2, 316-3, . . . 316-Z. The BIT flag mask block 310 selectively masks one or more of the fault flags in the individual signal validation process block 204-1 from being logged into the fault manager 211 based on the information contained in the state data signals 316-1, 316-2, 316-3, . . . 316-Z. While there are various methods and means for implementing each of these functions, in the depicted embodiment each function is implemented using table entries that include logical expressions or diagrams corresponding to various, predetermined system state conditions. The system state conditions for each function may vary, and may be defined by the system designer.

The severity level select block 314 uses the collective outputs of the persistence function process block 306 to determine the overall severity level of the input signal 206-1 and supplies this information signal 210-1 to the input signal arbitration process block 208. In the depicted embodiment, the severity level select block 314 does so by selecting "high" between each of the fault flags. For example, if one or more fault flags is "confirmed" (e.g., a "2"), a severity level signal 210-1 of "2" is supplied to the input signal arbitration process block 208. If no fault flags are "confirmed," and one or more fault flags is "unconfirmed" (e.g., a "1"), then a severity level signal 210-1 of "1" is supplied to the input signal arbitration process block 208. Similarly, if no fault flags are either "confirmed" or "unconfirmed," then a severity level signal 210-1 of "0" is supplied to the input signal arbitration process block 208. It will be appreciated that the severity level select block 314 may be implemented in numerous other functional configurations. It will additionally be appreciated that the persistence function process block 306 and, concomitantly, the severity level select block 314, may be implemented to supply more or less than three different input signal severity levels.

Turning now to a detailed description of the input signal arbitration process block 208, it can be seen that this functional block is implemented using a deterministic arbitration algorithm. In the depicted embodiment, the arbitration algorithm is implemented using a deterministic truth table 318. For each input signal 206-1, 206-2, 206-SYNTH in the channel 200, all possible state combinations of input signal severity levels (e.g., "0," "1," or "2") are defined and placed into separate entries in the truth table 318. For each input signal severity level state combination, the truth table 318 includes another entry into which is placed the particular signal value 214 to supply to the control logic process block 216 for further processing. The signal value 214 for a particular input signal severity level state combination may be predetermined by the system designer, and may be, for example, the present value of the selected input signal, the highest signal value of each of the present input signals, the lowest value of each of the present input signals, an average of the signal values of the present input signals, the last valid signal value for the selected input signal, the value for the selected input signal that occurred some predetermined time period ago, or a default value.

As shown in the depicted embodiment, the truth table 318 may also include an entry for signal health status information and for signal source information. The signal health status information may be used by the control logic process block 216 to modify the control law being implemented in the channel 200 based upon the degradation of the selected input signal. Likewise, the signal source information may be used by the control logic process block 216 to compensate the control law being implemented in the channel 200 for potential variations in input signal characteristics based on the physical location where the input signal originated.

A filter 320 may be provided in the signal path between the input signal arbitration process block 208 and the control logic process block 216 to filter the signal value 214. The filter 320 may be provided since the arbitration process may result in a step change in the signal value 214 upon switching from one input signal to another. In a preferred embodiment, the filter 320 implements a selectable and configurable filtration algorithm to smooth the signal value 214, if necessary.

Figure 4:
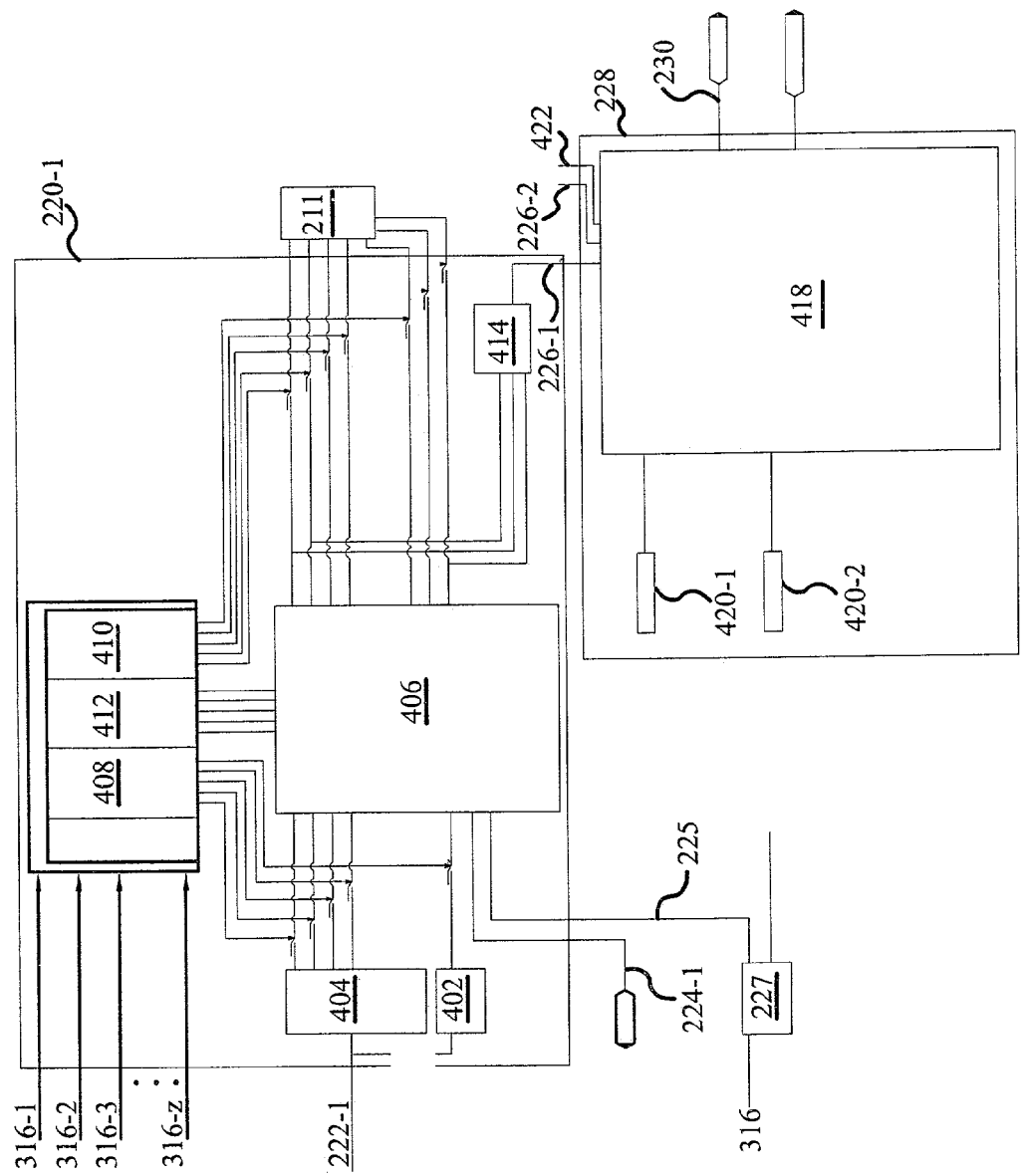
FIGS. 4–4E are more detailed functional block diagrams of those portions of the exemplary channel depicted in FIG. 2 that implement the output signal validation and arbitration methodology according to an exemplary embodiment of the present invention.
Figure 4A:
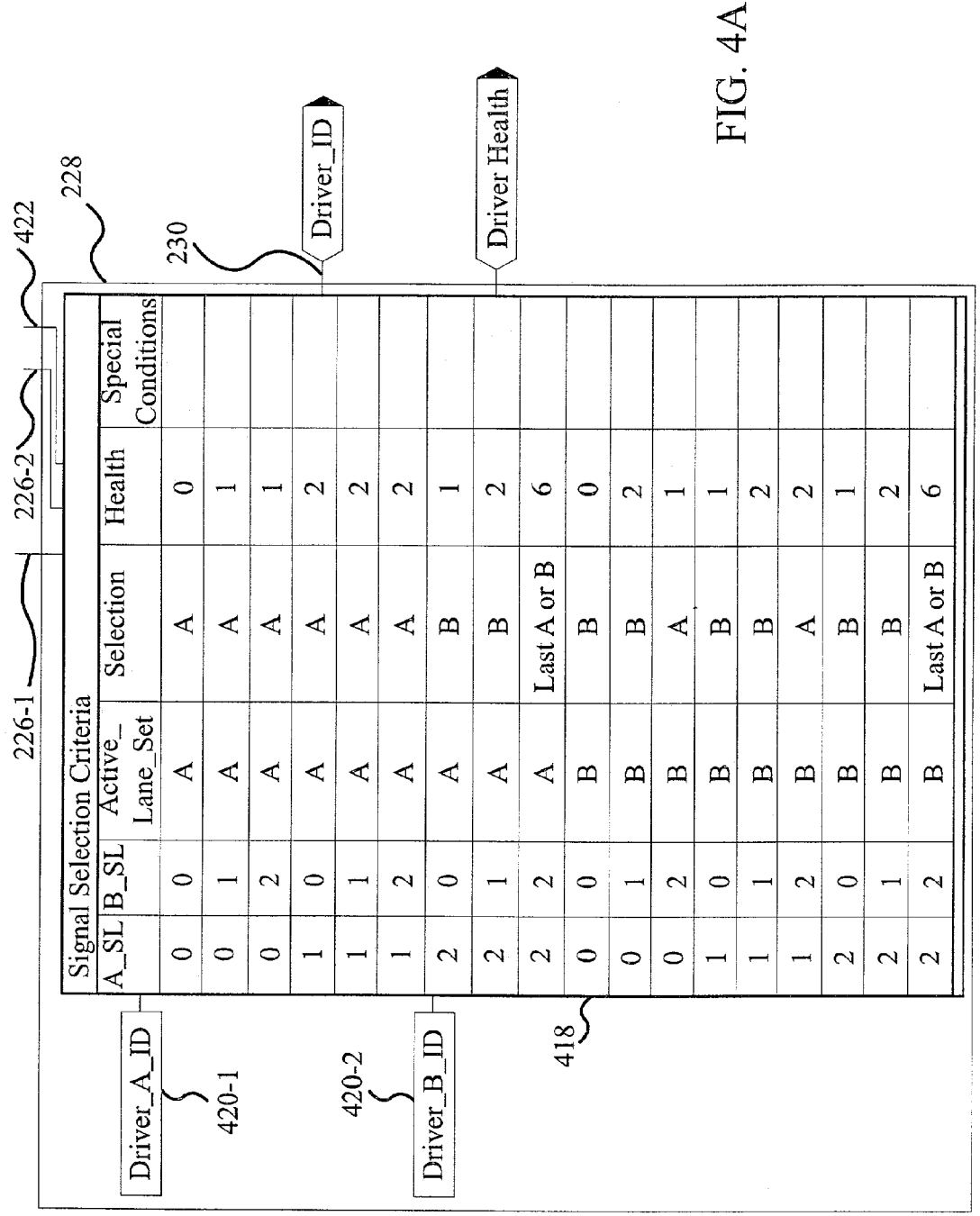
Figure 4B:
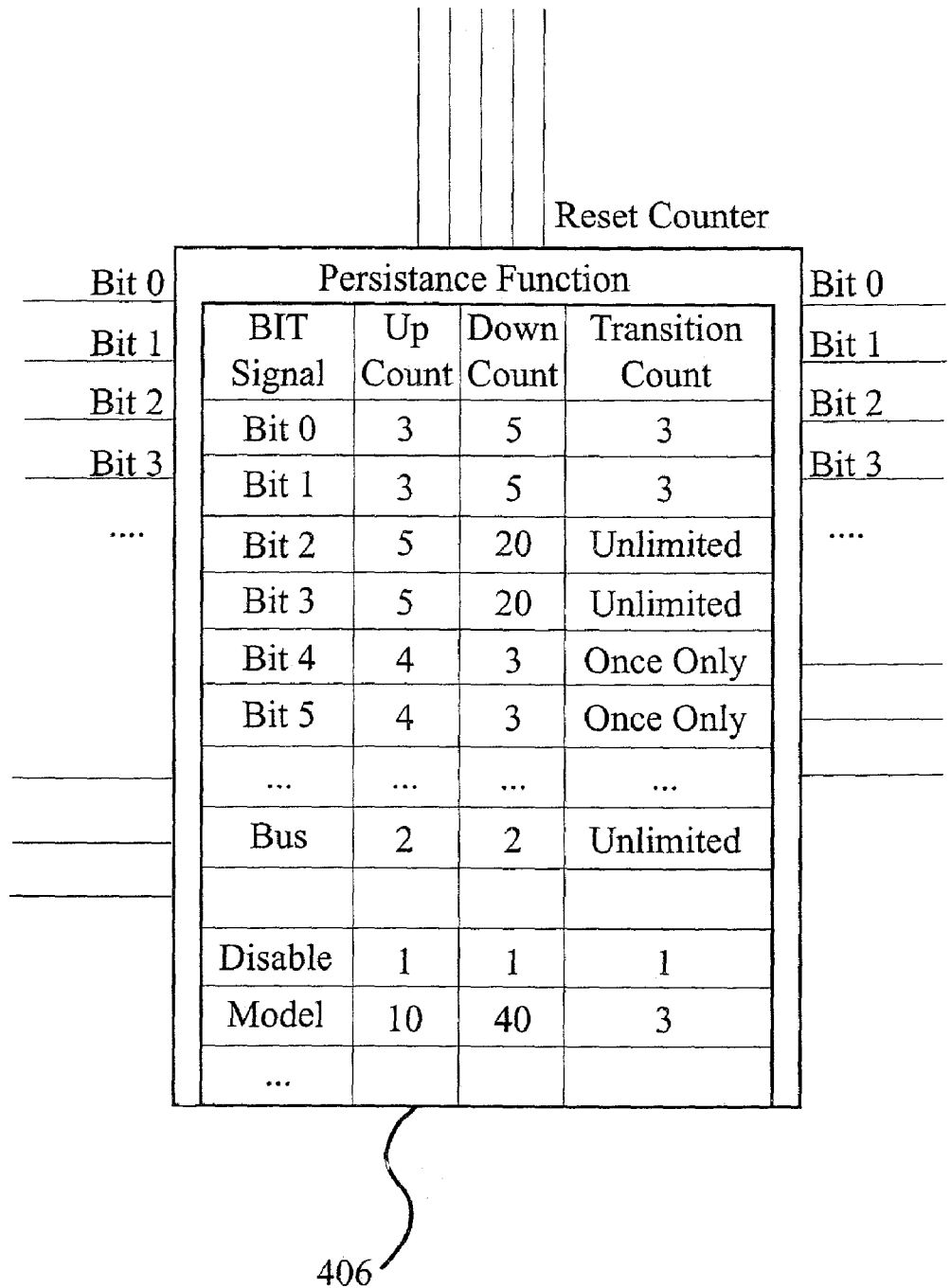
Figure 4C:
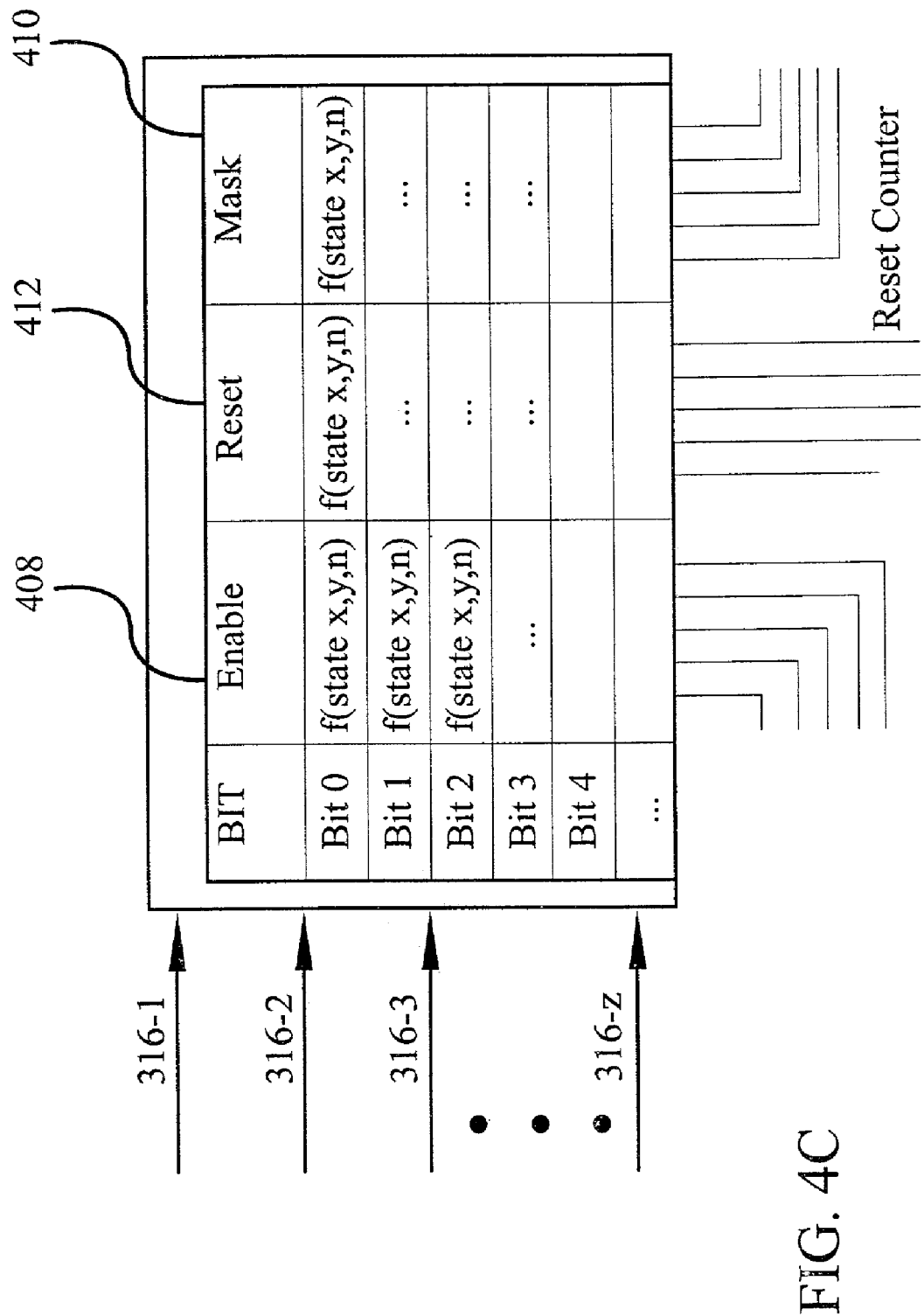
Figure 4D:
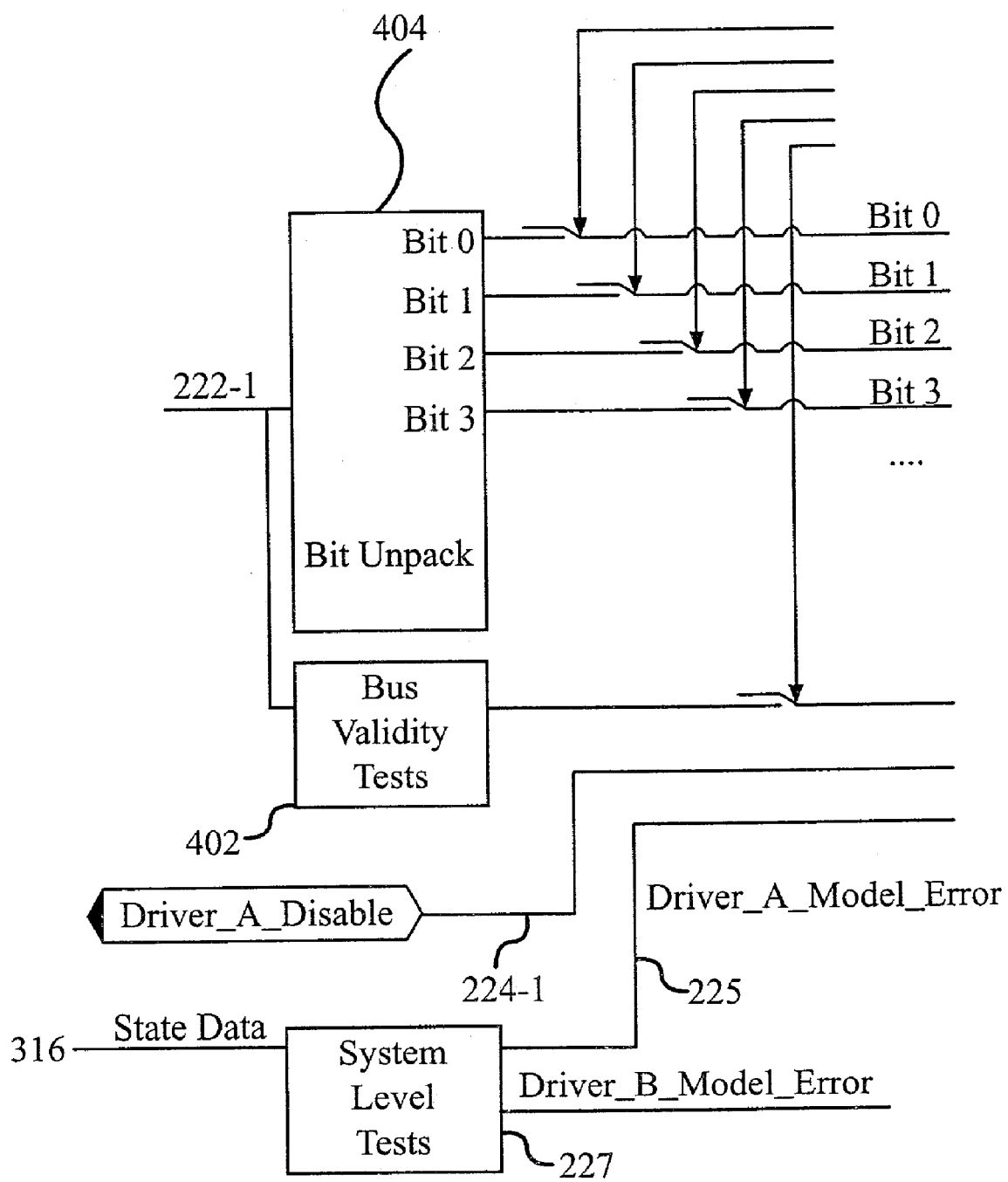
Figure 4E:
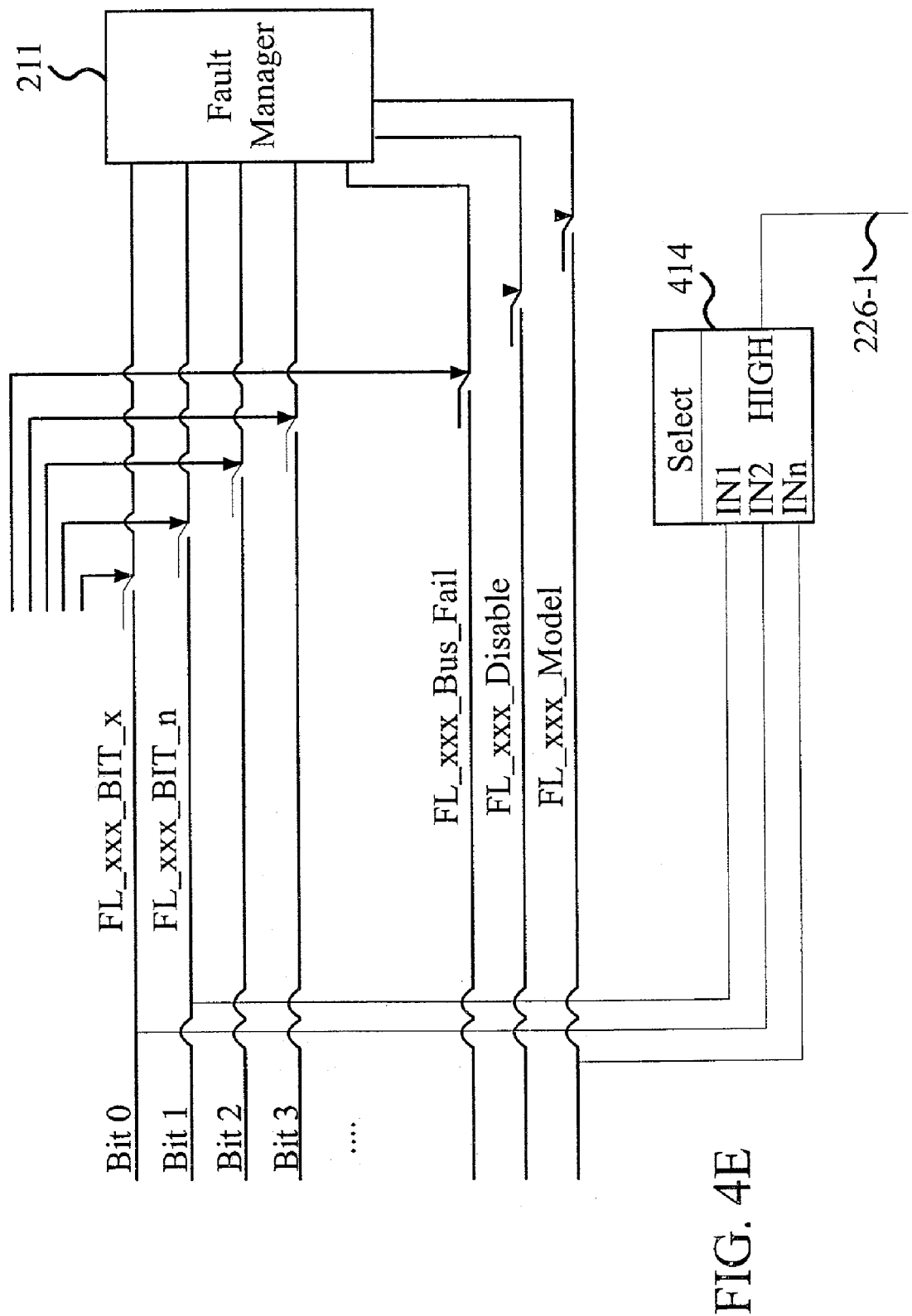

Referring now to FIGS. 4–4E, the output signal validation and arbitration process blocks and the processes carried out by each will be described. As can be seen from the depicted figure, these process blocks, and their associated processing, are similar to the process blocks associated with the input signals. Thus, looking first at art exemplary individual output signal validation processing block 220-1, it can be seen that this block includes a bus validity test block 402, a BIT signal processing block 404, a persistence function processing block 406, a BIT flag enable block 408, a BIT flag mask block 410, a counter reset block 412, and a severity level select block 414. It can also be seen that the depicted individual output signal validation process block 220-1 receives a plurality of input signals, which includes the BIT signal 222-1 associated with one of the redundant output drivers, the system level test result signal 225, a driver disable signal 224-1, as well as the plurality of state data signals 316-1, 316-2, 316-3, . . . 316-Z that were described above.

The redundant driver BIT signal 222-1, similar to the input BIT signal 208-1, may be a digital word that is made up of individual BIT fault flags. Thus, the driver BIT signal 222-1, in the depicted embodiment, is supplied to the driver BIT signal processing block 404, which unpacks and retrieves the individual BIT fault flags from the BIT word. As previously described, an individual BIT fault flag may be set to a "true" state (e.g., a logical "1") if, for example, the particular test limit has been exceeded. Otherwise, it will be set to a "false" state (e.g., a logical "0"). The specific types of failures detected by the BIT test suite, and criteria for each, may vary and may be determined by the particular system designer.

The output signal bus validity test block 402, similar to the input signal bus validity test block 302, functions to determine various instances of signal failures that may not be generated from the driver BIT test suite, and to supply one or more bus validity fault flags. The specific types of signal failures and criteria for each may vary and may be determined by the particular system designer. As with the BIT test suite, the specific types of failures detected by the output signal bus validity test block 402, and the criteria for each, may vary and may be determined by the particular system designer.

The system level test block 227 uses various system models, such as loop closure models, to detect various mechanical and electrical failures of the control components in each channel. To do so, the system level test block 227 receives one or more of the state data signals 316-1, 316-2, 316-3, . . . 316-Z, and may also receive a signal representative of the control signal generated in the channel 200, and a signal representative of the feedback signal from the control component in the channel 200. Based on the tests carried out using the system models, the system level test block 227 will generate a system level test fault flag, signifying whether or not a component fault has been detected. This system level test fault flag is the supplied system level test result signal 225.

Under certain system operating conditions or configurations, the system may independently generate an output driver disable signal 224-1 for a particular output driver associated with the channel 200. This output driver disable signal 224-1, as well as the output driver BIT fault flags, the bus validity fault flags, and the system level test fault flag, are all supplied to the persistence function process block 406. The persistence function process block 406 in the output signal validation process block 220-1 functions substantially identical to the persistence function process block 306 in the input signal validation process block 204-1. Hence, it will not be described further, as its operation will be readily apparent to the skilled artisan. Similarly, the BIT flag enable block 408, the BIT flag mask block 410, the counter reset block 412, and the severity level select block 414 all function substantially identical to the ones in the input signal validation process block 204-1 to determine the overall severity level of the particular output driver, and will therefore also not be further described.

The output signal arbitration process block 228 depicted in FIG. 4 functions, and may also be implemented, substantially identical to the input signal arbitration process block 208. For example, in the depicted embodiment, the output signal arbitration algorithm is implemented using a deterministic truth table 418. For each output driver in the channel 200, which has a unique embedded identification number 420-1, 420-2 assigned to it, all possible state combinations of output signal severity levels are defined and placed into separate entries in the truth table 418. For each input signal severity level state combination, the truth table 418 includes another entry into which is placed the identification number of the output driver in the channel 200 that is to be enabled.

The truth table 418 may also include an active lane setting signal input 422. In systems with redundant channels, a separate process may be implemented to determine which of the redundant drivers in a channel is defaulted as the active driver. The logic for determining the default active driver may be set by the system designer.

In addition, similar to the input signal arbitration truth table 318, the output signal arbitration truth table 418 may include an entry for output driver health status information. The driver health status information may be used by the control logic process block 216 to modify the control law being implemented in the channel based on the degradation of the signal.

The disclosed input and output signal validation, arbitration, and fault reporting system and method provides a common design framework for real-time controllers. The system and method reduces system development complexity, and/or reduces system development cycle time, and/or reduces development costs. It will be appreciated that the described system and method may implemented using either software, hardware, firmware, or any combination thereof.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. In a system including a controller coupled to receive at least two redundant input signals, a method of validating the redundant input signals and arbitrating between the redundant input signals, comprising:
   determining a fault severity level for each of the redundant input signals; and
   determining a signal value to transmit for further processing by the controller based at least in part on the determined fault severity level of each of the redundant input signals;
   determining a health status level for the determined signal value; and
   transmitting the determined health status level with the determined signal value for further processing.

2. The method of claim 1, wherein the step of determining the fault severity level for each of the redundant input signals comprises:
   determining whether a particular fault is associated with the input signal; and
   determining a fault persistence time period for the particular fault, wherein the fault persistence time period corresponds to a time period that the particular fault persists.

3. The method of claim 2, Thither comprising:
   assigning a maximum fault severity level to the input signal if the fault persistence time period is at least a first predetermined time period; and
   assigning an intermediate fault severity level to the input signal if the particular fault is present and the fault persistence time period is less than the first predetermined time period.

4. The method of claim 2, wherein the step of determining whether a particular fault is associated with the input signal comprises:
   analyzing built-in-test (BIT) data associated with the input signal;
   comparing each of the redundant input signals with one another; and
   determining whether a fault exists in a data bus transmitting the input signal.

5. The method of claim 2, further comprising:
   determining an operational state of the system; and
   selectively enabling and disabling the particular fault based at least in part on the determined system operational state.

6. The method of claim 2, wherein the system further includes a fault manager, and wherein the method further comprises:
   determining an operational state of the system; and
   selectively inhibiting the particular fault from being logged in the fault manager based at least in part on the determined system operational state.

7. The method of claim 3, further comprising:
   determining whether the particular fault is no longer present;

determining a fault reset time period for the particular fault, wherein the fault reset time corresponds to a time that the particular fault is no longer present; and assigning a minimal fault severity level to the input signal if the fault reset time period is at least a second predetermined time period.

8. The method of claim 7, further comprising:

counting a number of times that the fault severity level assigned to the input signal transitions from the maximum severity level to the minimum severity level; and inhibiting transition from the maximum fault severity level to the minimum fault severity level when the counted number of times is at least a first predetermined number.

9. The method of claim 8, further comprising:

determining an operational state of the system; and determining a value of the first predetermined number based at least in part on the determined system operational state.

10. The method of claim 1, wherein the determined signal value is based on a value of at least one of the redundant input signals.

11. The method of claim 1, further comprising:

determining a signal source of the determined signal value.

12. The method of claim 11, further comprising:

transmitting the determined signal source with the determined signal value for further processing.

13. The method of claim 1, wherein the further processing of the determined signal value includes a filtering process.

14. The method of claim 1, wherein a deterministic truth table is used to determine the signal value.

15. The method of claim 1, wherein at least one of the redundant input signals is a synthesized input signal.

16. In a system including a controller having at least two redundant output drivers coupled to receive a control signal, a method of validating the redundant output drivers and arbitrating between the redundant output drivers, comprising:

determining a fault severity level for each of the redundant output drivers; and selecting one of the redundant output drivers to receive the control signal by the controller based at least in part on the determined fault severity level of each of the redundant output drivers.

17. The method of claim 16, wherein the step of determining the fault severity level for each of the redundant output drivers comprises:

determining whether a particular fault is associated with the output driver; and determining a fault persistence time period for the particular fault, wherein the fault persistence time period corresponds to a time period that the particular fault persists.

18. The method of claim 17, further comprising:

assigning a maximum fault severity level to the output driver if the fault persistence time period is at least a first predetermined time period; and assigning an intermediate fault severity level to the output driver if the particular fault is present and the fault persistence time period is less than the first predetermined time period.

19. The method of claim 18, further comprising:

determining whether the particular fault is no longer present;

determining a fault reset time period for the particular fault wherein the fault reset time corresponds to a time that the particular fault is no longer present; and assigning a minimal fault severity level to the output driver if the fault reset time period is at least a second predetermined time period.

20. The method of claim 19, further comprising:

counting a number of times that the fault severity level assigned to the output driver transitions from the maximum severity level to the minimum severity level; and inhibiting transition from the maximum fault severity level to the minimum fault severity level when the counted number of times is at least a first predetermined number.

21. The method of claim 20, further comprising:

determining an operational state of the system; and determining a value of the first predetermined number based at least in part on the determined system operational state.

22. The method of claim 17, wherein the step of determining whether a particular fault is associated with the output driver comprises:

analyzing built-in-test (BIT) data associated with the output driver;

performing system level tests; and determining whether a fault exists in a data bus transmitting the control signal.

23. The method of claim 17, further comprising:

determining an operational state of the system; and selectively enabling and disabling the particular fault based at least in part on the determined system operational state.

24. The method of claim 17, wherein the system further includes a fault manager, and wherein the method further comprises:

determining an operational state of the system; and selectively inhibiting the particular fault from being logged in the fault manager based at least in part on the determined system operational state.

25. The method of claim 16, further comprising:

determining a driver health status level for the selected output driver.

26. The method of claim 25, further comprising:

transmitting the determined driver health status level for further processing.

27. The method of claim 16, further comprising:

filtering the control signal.

28. The method of claim 16, wherein a deterministic truth table is used to select the output driver.

29. In a system including a controller coupled to receive at least two redundant input signals and having at least two redundant output drivers coupled to receive a control signal, a method of validating and arbitrating between the redundant input signals and validating and arbitrating between the redundant output drivers, the method comprising:

determining a fault severity level for each of the redundant input signals;

determining a signal value to transmit for further processing by the controller based at least in part on the determined fault severity level of each of the redundant input signals;

determining a fault severity level for each of the redundant output drivers; and selecting one of the redundant output drivers to receive the processed signal value from the controller based at least in part on the determined fault severity level of each of the redundant output drivers.

30. A system for validating redundant input signals and arbitrating between the redundant input signals, comprising:
at least two inputs each coupled to receive one of the redundant input signals;
fault severity level determination means for receiving at least each redundant input signal and determining a fault severity level for each based at least in part thereon;
signal value determination means for receiving the determined fault severity level and determining a signal value based at least in part thereon;
a controller coupled to receive the determined signal value from the signal value determination means; and
health status level determination means for receiving the determined fault severity level and supplying a health status level of the determined signal value to the controller.

31. The system of claim 30, wherein the fault severity level determination means comprises one each of the following for each of the redundant input signals:
fault determination means for determining whether a particular fault is associated with the input signal; and
fault persistence means for determining a fault persistence time period for the particular fault, wherein the fault persistence time period corresponds to a time period that the particular fault persists.

32. The system of claim 31, further comprising:
fault persistence time determination means for determining a time period that a particular fault exists;
severity level assignment means for: (i) assigning a maximum fault severity level to the input signal if the fault persistence time period is at least a first predetermined time period and (ii) assigning an intermediate fault severity level to the input signal if the particular fault is present and the fault persistence time period is less than the first predetermined time period.

33. The system of claim 32, further comprising:
fault reset determination means for determining whether the particular fault is no longer present; and
fault reset time period determination means for determining a fault reset time period for the particular fault,
wherein the fault reset time corresponds to a time that the particular fault is no longer present, and
wherein the severity level assignment means assigns a minimal fault severity level to the input signal if the fault reset time period is at least a second predetermined time period.

34. The system of claim 33, further comprising:
transition counting means for counting a number of times that the fault severity level assigned to the input signal transitions from the maximum severity level to the minimum severity level; and
transition inhibiting means for inhibiting the transition from the maximum fault severity level to the minimum fault severity level when the counted number of times is at least a first predetermined number.

35. The system of claim 34, further comprising:
fault reset inhibit determination means for receiving at least one signal representative of an operational state of the system and determining a value of the first predetermined number based at least in part on the system operational state signal.

36. The system of claim 31, further comprising:
built-in-test analyzing means for analyzing built-in-test (BIT) data associated with the input signal;
input signal comparison means fox comparing each of the redundant input signals with one another; and
bus fault determination means for determining whether a fault exists in a data bus transmitting the input signal.

37. The system of claim 31, further comprising:
fault enabling means for receiving at least one signal representative of an operational state of the system and selectively enabling and disabling the particular fault based at least in part on the system operational state signal.

38. The system of claim 31, further comprising:
fault management means for logging each of the particular faults; and
fault masking means for receiving at least one signal representative of an operational state of the system and selectively inhibiting the particular fault from being logged in the fault manager based at least in part on the system operational state signal.

39. The system of claim 30, wherein the determined signal value is based on a value of at least one of the redundant input signals.

40. The system of claim 30, further comprising:
signal source determining means for determining a source of the determined signal value and supplying the determined signal source to the controller.

41. The system of claim 30, further comprising:
filtering means for receiving and filtering the determined signal value and transmitting the filtered determined signal value to the controller.

42. The method of claim 30, Thither comprising:
input signal synthesizing means for supplying a synthesized signal as one of the redundant input signals.

43. A system for validating redundant output drivers coupled to a controller and arbitrating between the redundant output drivers, comprising:
a controller operable to supply a control signal to at least one of the redundant output drivers;
fault severity Level determination means for determining a fault severity level for each of the redundant output drivers; and
driver selection means for receiving the determined fault severity level and selecting an output driver based at least in part thereon.

44. The system of claim 43, wherein the fault severity level determination means comprises one each of the following for each of the redundant drivers:
fault determination means for determining whether a particular fault is associated with the output driver; and
fault persistence means for determining a fault persistence time period for the particular fault wherein the fault persistence time period corresponds to a time period that the particular fault persists.

45. The system of claim 44, further comprising:
fault persistence time determination means for determining a time period that a particular fault exists; and
severity level assignment means for: (i) assigning a maximum fault severity level to the output driver if the fault persistence time period is at least a first predetermined time period and (ii) assigning an intermediate fault severity level to the output driver if the particular fault is present and the fault persistence time period is less than the first predetermined time period.

46. The system of claim 45, further comprising:
fault reset determination means for determining whether the particular fault is no longer present; and
fault reset time period determination means for determining a fault reset time period for the particular fault,
wherein the fault reset time corresponds to a time that the particular fault is no longer present, and wherein the severity level assignment means assigns a minimal fault severity level to the output driver if the fault reset time period is at least a second predetermined time period.

47. The system of claim 46, further comprising:

transition counting means for counting a number of times tat the fault severity level assigned to the output driver transitions from the maximum severity level to the minimum severity level; and transition inhibiting means for inhibiting the transition from the maximum fault severity level to the minimum fault se-verity level when the counted number of times at least a first predetermined number.

48. The system of claim 47, further comprising:

fault reset inhibit determination means for receiving at least one signal representative of an operational state of the system and determining a value of the first predetermined number based at least in part on the system operational state signal.

49. The system of claim 44, further comprising:

built-in-test analyzing means for analyzing built-in-test (BIT) data associated with the output driver;

system level test means for conducting simulated tests of each of the redundant output drivers; and bus fault determination means for determining whether a fault exists in a data bus transmitting the BIT data.

50. The system of claim 44, further comprising:

fault enabling means for receiving at least one signal representative of an operational state of the system and selectively enabling and disabling the particular fault based at least in part on the system operational state signal.

51. The system of claim 44, further comprising:

fault management means for logging each of the particular faults; and fault masking means for receiving at least one signal representative of an operational state of the system and selectively inhibiting the particular fault from being logged in the fault manager based at least in part on the system operational state signal.

52. The system of claim 43, further comprising:

health status level determination means for receiving the determined fault severity level and supplying a health status level of the determined output driver to the controller.

53. A system for validating redundant input signals and redundant output drivers and arbitrating between the redundant input signals and the redundant output drivers, comprising:

at least two inputs each coupled to receive one of the redundant input signals;

input fault severity level determination means for receiving at least each redundant input signal and determining an input fault severity level for each based at least in part thereon;

signal value determination means for receiving the determined input fault severity level and determining a signal value based at least in part thereon;

a controller coupled to receive the determined signal value from the signal value determination means and operable to supply a control signal to at least one of the redundant output drivers;

driver fault severity level determination means for determining a driver fault severity level for each of the redundant output drivers; and driver selection means for receiving the determined fault severity level and selecting an output driver based at least in part thereon.

54. In a system including a controller coupled to receive at least two redundant input signals, a method of validating the redundant input signals and arbitrating between the redundant input signals, comprising:

determining a fault severity level for each of the redundant input signals;

determining a signal value to transmit for further processing by the controller based at least in part on the determined fault severity level of each of the redundant input signals;

determining a signal source of the determined signal value; and transmitting the determined signal source with the determined signal value for further processing.

55. A system for validating redundant input signals and arbitrating between the redundant input signals, comprising:

at least two inputs each coupled to receive one of the redundant input signals;

fault severity level determination means for receiving at least each redundant input signal and determining a fault severity level for each based at least in part thereon;

signal value determination means for receiving the determined fault severity level and determining a signal value based at least in part thereon;

a controller coupled to receive the determined signal value from the signal value determination means; and signal source determining means for determining a source of the determined signal value and supplying the determined signal source to the controller.

* * * * *

UNITED STATES PATENT AND TRADEMARK OFFICE
CERTIFICATE OF CORRECTION

PATENT NO. : 7,093,168 B2 Page 1 of 1
APPLICATION NO. : 10/237834
DATED : August 15, 2006
INVENTOR(S) : Timothy Mahoney It is certified that error appears in the above-identified patent and that said Letters Patent is hereby corrected as shown below:

Column 10, line 17, remove the word "and";
Column 10, line 35, "Thither" should be changed to --further--;
Column 14, line 28, "Thither" should be changed to --further--;
Column 14, line 36, "Level" should be changed to --level--;
Column 15, line 7, "tat" should be changed to --that--; and
Column 15, line 12, "se-verity" should be changed to --severity--.

Signed and Sealed this

Tenth Day of April, 2007

JON W. DUDAS
*Director of the United States Patent and Trademark Office*